US009200975B2

(12) United States Patent
Hattar et al.

(10) Patent No.: US 9,200,975 B2
(45) Date of Patent: Dec. 1, 2015

(54) PRESSURE DIAGNOSTIC SYSTEM AND METHOD

(75) Inventors: Rafat F. Hattar, Milford, MI (US); Jeffrey M. Hutmacher, Fowlerville, MI (US); Paul D. Donar, Fenton, MI (US); Matthew Timothy Hamilton, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1044 days.

(21) Appl. No.: 13/296,868

(22) Filed: Nov. 15, 2011

(65) Prior Publication Data

US 2013/0124144 A1    May 16, 2013

(51) Int. Cl.
*G01L 27/00*     (2006.01)
*G06F 17/40*     (2006.01)
*G06F 19/00*     (2011.01)
*F02D 41/22*     (2006.01)
*F02D 41/38*     (2006.01)

(52) U.S. Cl.
CPC ............. *G01L 27/007* (2013.01); *F02D 41/22* (2013.01); *F02D 41/221* (2013.01); *F02D 41/222* (2013.01); *F02D 41/3836* (2013.01); *F02D 2041/223* (2013.01); *F02D 2200/0602* (2013.01); *G06F 17/40* (2013.01); *G06F 19/00* (2013.01)

(58) Field of Classification Search
CPC ....... F02D 41/00; F02D 41/22; F02D 41/222; F02D 41/223; F02D 41/30; F02D 41/38; F02D 2200/00; F02D 2200/02; F02D 2200/06; F02D 2200/0602; F02D 2041/00; F02D 2041/22; F02D 2041/223; G01D 7/00; G01D 9/00; G01D 21/00; G01L 7/00; G01L 9/00; G01L 11/00; G01L 13/00; G01L 27/00; G01L 27/007; G06F 11/00; G06F 11/30; G06F 11/32; G06F 11/34; G06F 15/00; G06F 15/16; G06F 17/00; G06F 17/10; G06F 17/40; G06F 19/00
USPC ............... 73/432.1, 700, 865.8, 865.9, 866.3; 324/500; 340/500, 540, 603, 626; 702/1, 85, 98, 104, 127, 138, 182, 183, 702/187, 189; 708/100, 105, 200
See application file for complete search history.

(56) References Cited

U.S. PATENT DOCUMENTS

| 4,541,386 A | * | 9/1985 | Kishi et al. ................. 123/479 |
| 8,280,575 B2 | * | 10/2012 | Takahashi ................. 701/31.4 |
| 2008/0306648 A1 | * | 12/2008 | Takahashi ................. 701/29 |

* cited by examiner

*Primary Examiner* — Edward Cosimano

(57) ABSTRACT

A pressure diagnostic system includes a pressure error calculating module that generates a pressure error based on a first pressure signal and a second pressure signal. A difference calculating module generates a desired pressure difference based on a current desired pressure and a prior desired pressure. A lag filter module applies lag filter to the pressure error to generate a lag filtered pressure error. A fault module selectively generates a fault based on the lag filtered pressure error.

20 Claims, 5 Drawing Sheets

PRESSURE DIAGNOSTIC SYSTEM AND METHOD

FIELD

The present disclosure relates to pressure diagnostic systems and methods, and more particularly to pressure diagnostic systems and methods for dual pressure sensor systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some fuel injection systems for engines may be operated at high pressure to spray fuel directly into combustion chambers. A fuel pump supplies high pressure fuel to a fuel rail. Fuel injectors in the fuel rail inject the high pressure fuel directly into the combustion chambers.

First and second pressure sensors may be used to detect the pressure in the fuel rail. An intrusive diagnostic system may be used to detect faults in the first and second pressure sensors. The intrusive diagnostic tests may be detrimental to fuel pump life due to operation above maximum recommended pressures. The intrusive tests may also be perceived by the vehicle occupants, which reduces customer satisfaction. As a result, these diagnostic tests may only be run less often than desired such as once per drive cycle.

SUMMARY

A pressure diagnostic system includes a pressure error calculating module that generates a pressure error based on a first pressure signal and a second pressure signal. A pressure difference module generates a desired pressure difference based on a current desired pressure and a prior desired pressure. A lag filter module applies a lag filter to the pressure error to generate a lag filtered pressure error. A fault module selectively generates a fault based on the lag filtered pressure error.

In other features, the pressure error calculating module generates the pressure error based on an inverse of a function of ratio of the second pressure signal to the first pressure signal. The function is a square root of the ratio of the second pressure signal to the first pressure signal. The lag filter module selects lag filter terms based on the desired pressure difference. The fault module selectively triggers the fault based on comparison of the lag filtered pressure error to a pressure range. The fault module adjusts the pressure range based on the current desired pressure.

In other features, a suspension module selectively suspends identification of the fault based on the desired pressure difference. The suspension module suspends identification of the fault when the desired pressure difference is greater than a predetermined desired pressure difference. A filtering module filters the first pressure signal and the second pressure signal before the pressure error calculating module generates the pressure error. An out of range module determines whether the first pressure signal and the second pressure signal are out of range before the pressure error calculating module generates the pressure error.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
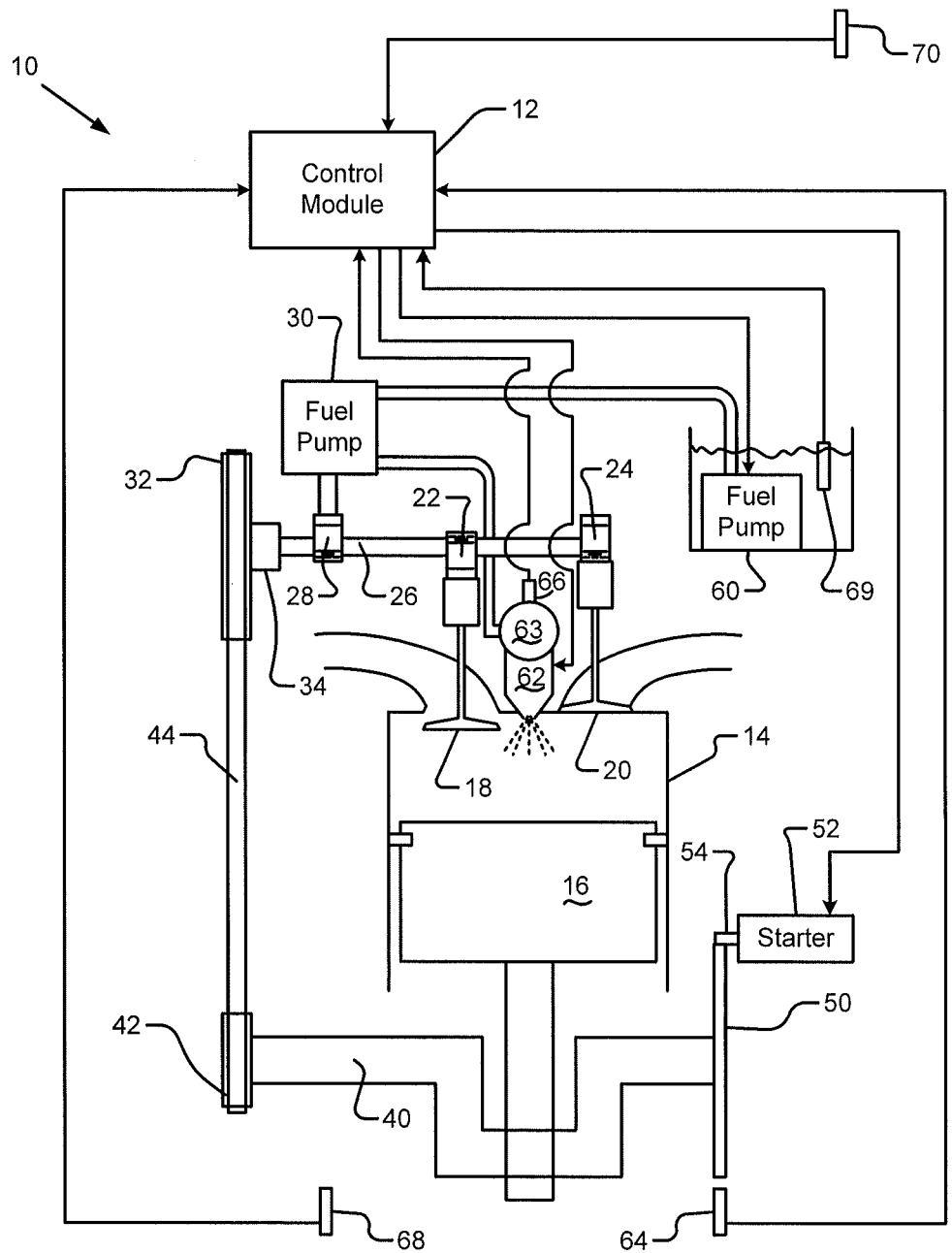
FIG. 1 is a functional block diagram of an exemplary engine according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A diagnostic control system and method according to the present disclosure identifies pressure sensor faults in systems using dual pressure sensors. For example only, the dual pressure sensors may be used to detect fuel system pressures in a fuel rail for an engine. While an exemplary a engine is shown, the diagnostic control system and method may be used to detect pressure faults in other engine systems or non-engine systems with dual pressure sensors.

Referring now to FIG. 1, an engine 10 includes a control module 12 and one or more cylinders 14 each including a piston 16. An intake valve 18 opens to allow intake air into the cylinder 14. An exhaust valve 20 opens to allow exhaust gas to escape from the cylinder 14. An intake cam lobe 22 and an exhaust cam lobe 24 open and close the intake valve 18 and the exhaust valve 20, respectively. A cam shaft 26 includes the intake cam lobe 22, the exhaust cam lobe 24, and a fuel pump lobe 28 that drives a fuel pump 30. The fuel pump 30 may also be gear driven and/or electric. A cam shaft gear 32 drives the cam shaft 26 via an adjustable cam phaser 34.

The piston 16 reciprocates to drive a crankshaft 40. A crankshaft gear 42 rotates with the crankshaft 40. The crankshaft gear 42 drives the cam shaft gear 32 via a belt or chain 44. In various embodiments, the belt or chain 44 may be replaced with gears. A ring gear 50 is attached to the crankshaft 40. A starter 52 includes a pinion gear 54 that can engage the ring gear 50. The starter 52 can then rotate the crankshaft 40 via the ring and pinion gears 50, 54 to reciprocate the piston 16 and thereby start the engine 10.

The control module 12 sends control signals to the starter 52, a fuel pump 60, and a fuel injector 62. The fuel pump 60 may be an electric, low-pressure fuel pump that sends fuel to the fuel pump 30, and the fuel pump 30 may be a high-pressure fuel pump that sends high-pressure fuel to a fuel rail 63. The fuel injector 62 injects fuel from the fuel rail 63 into the cylinder 14. The fuel injector 62 injects fuel by opening to allow the high-pressure fuel in the fuel rail 63 to flow through the fuel injector 62 and into the cylinder 14.

The control module 12 receives sensor signals from a crankshaft position sensor (CPS) 64, a fuel rail pressure (FRP) sensor system 66, an engine coolant temperature (ECT) sensor 68, a fuel ethanol percentage (FEP) sensor 69, and a driver input sensor 70. The CPS 64 detects a speed of crankshaft 40 and provides the crankshaft speed to the control module 12. The FRP sensor system 66 detects a pressure in the fuel rail 63 and provides the fuel rail pressure to the control module 12. The ECT sensor 68 detects a temperature of coolant in the engine 10 and provides the engine coolant temperature to the control module 12.

The FEP sensor 69 detects a parameter that may be used to determine a percentage of ethanol in fuel provided to the engine 10. The ethanol parameter may be the fuel ethanol percentage or an oxygen level in exhaust. The FEP sensor 69 provides the ethanol parameter to the control module 12. The FEP sensor 69 may be located in a fuel system or in an exhaust system.

Figure 2:
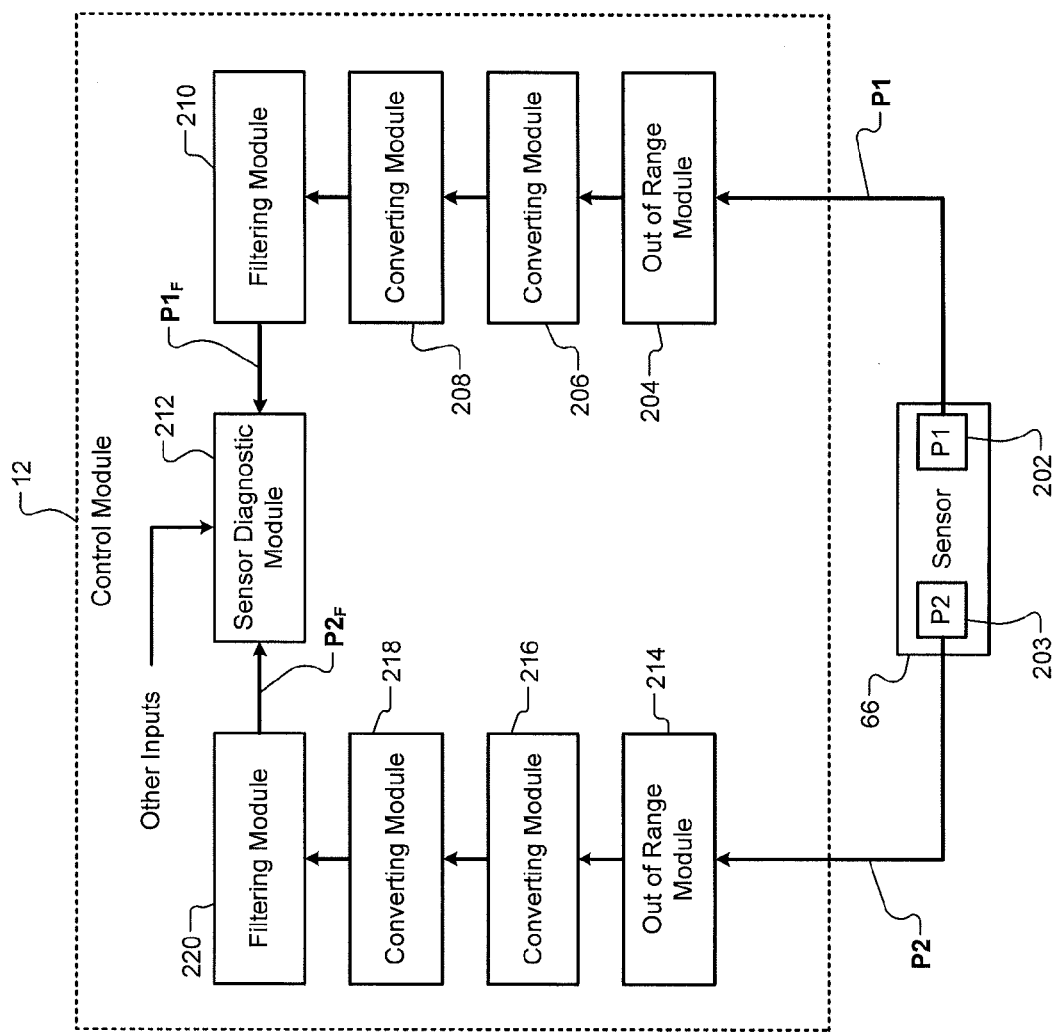
FIG. 2 is a functional block diagram of portions of an engine control system for the engine according to the present disclosure.

Referring now to FIG. 2, the control module 12 is shown in further detail. The FRP sensor system 66 includes a first or primary pressure sensor 202 that generates a first pressure signal P1 and a second or secondary pressure sensor 203 that generates a second pressure signal P2. The first and second pressure sensors 202 and 203 monitor the pressure of the fuel rail. The first pressure signal P1 of the first pressure sensor 202 is input to an out of range module 204. The out of range module 204 determines whether the first pressure signal P1 is within a predetermined voltage range.

A converting module 206 converts the first pressure signal P1 from a voltage to a percentage. An output of the converting module 206 is input to a converting module 208. The converting module 208 converts the percentage to a pressure value. A filtering module 210 filters the pressure value output by the converting module 208 and outputs a first filtered pressure value $P1_F$ to a sensor diagnostic module 212, which is described further below. In some examples, the filtering module 210 may include a lag filter that uses fixed or variable lag filter terms.

The second pressure signal P2 of the second pressure sensor 203 is input to an out of range module 214. The out of range module 214 determines whether the second pressure signal P2 is within a predetermined voltage range.

A converting module 216 converts the second pressure signal P2 from a voltage to a percentage. An output of the converting module 216 is input to a converting module 218. The converting module 218 converts the percentage to a pressure value. A filtering module 220 filters the pressure value output by the converting module 218 and outputs a second filtered pressure value $P2_F$ to the sensor diagnostic module 212. In some examples, the filtering module 220 may include a lag filter that uses fixed or variable lag filter terms.

As will be described further, the sensor diagnostic module 212 monitors the first and second filtered pressure values, current and desired pressured values and/or other input values and selectively indicates a pressure sensing fault. The control module 12 may indicate a malfunction to a visual or audible driver interface and/or alter an operating parameter of the engine when the pressure sensing fault occurs. For example only, the control module 12 may enter a limp home mode.

Figure 3:
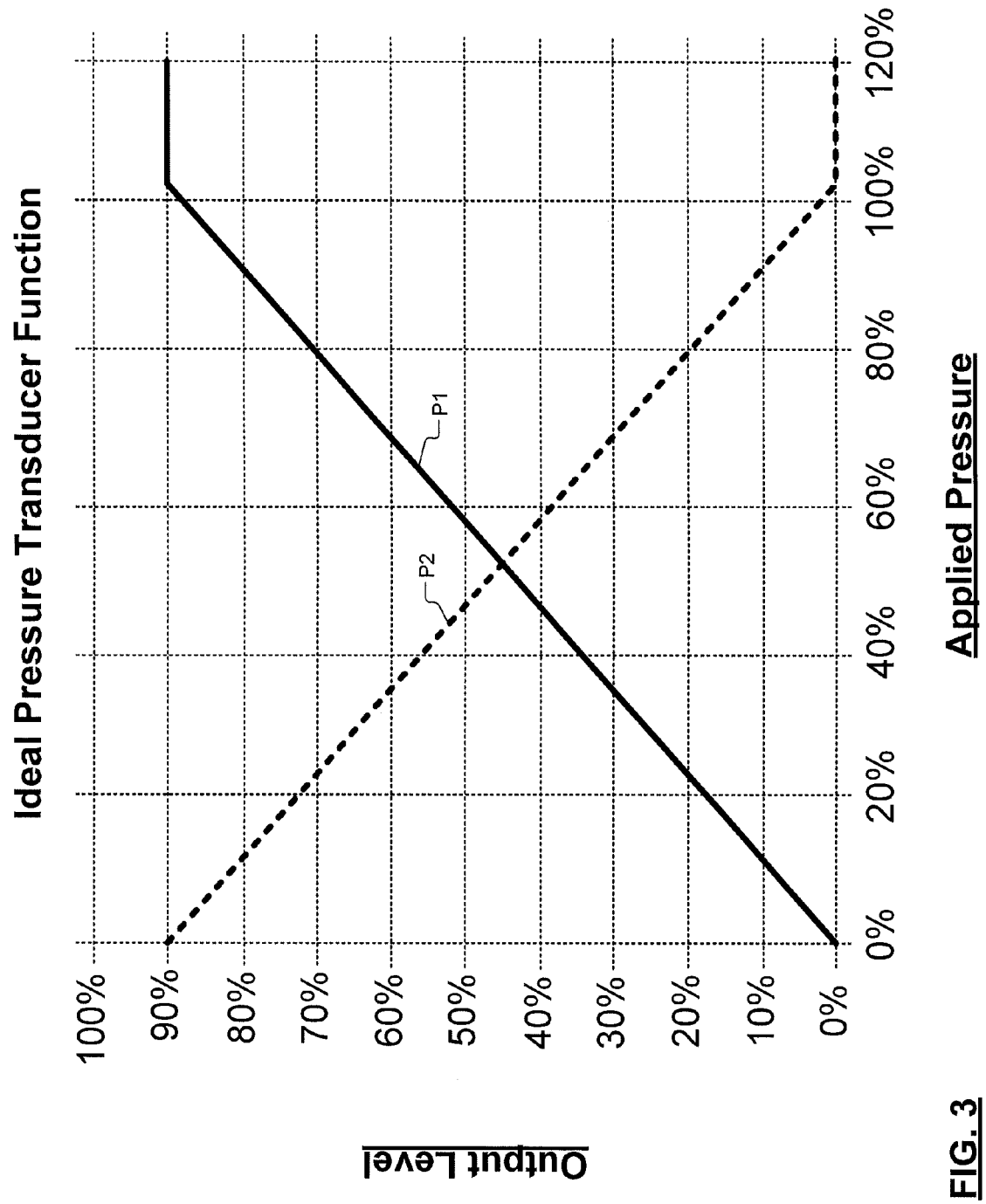
FIG. 3 is a graph showing an example of ideal pressure transducer functions for the first and second pressure sensors.

Referring now to FIG. 3, example ideal pressure transducer functions are shown. In this example, the pressure sensor 202 generates the pressure signal P1 that increases with increasing pressure while the pressure sensor 203 generates the pressure signal P2 that decreases with decreasing pressure. As can be appreciated, other pressure transducer functions may be used.

Figure 4:
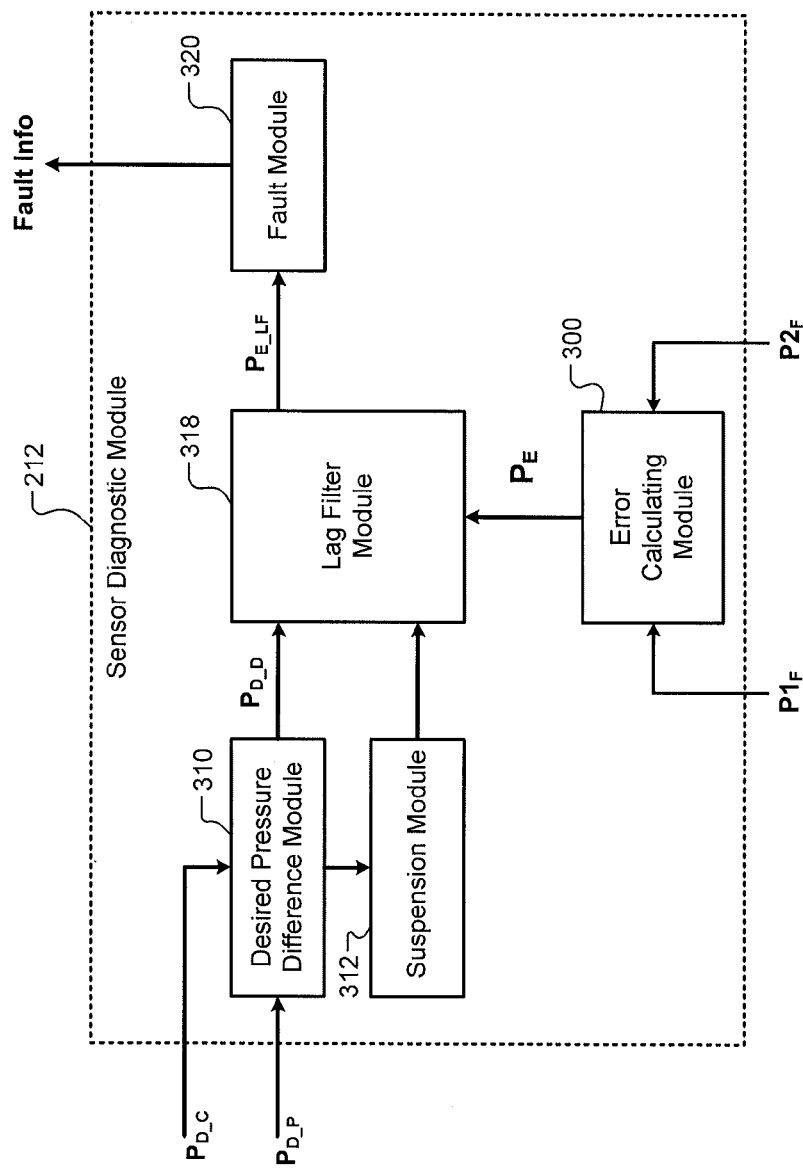
FIG. 4 is a functional block diagram of a pressure diagnostic system for the engine according to the principles of the present disclosure.

Referring now to FIG. 4, the sensor diagnostic module 212 is shown in further detail. An error calculating module 300 receives the first filtered pressure sensor value $P1_F$ and the second filtered pressure sensor value $P2_F$ and generates a pressure error $P_E$.

The error calculating module 300 may calculate the pressure error $P_E$ based on a simple difference or may use a lookup table, a more complex function or a relationship. In some examples of the present disclosure, the pressure error $P_E$ can be calculated based on the following relationship:

$$P_E = 1/(SQRT(P2_F/P1_F))$$

where SQRT is the square root function, $P2_F$ is the second filtered pressure value and $P1_F$ is the first filtered pressure value. Using this function may allow the pressure error $P_E$ to correlate with long term closed-loop fuel correction.

A pressure difference module 310 receives a current desired pressure $P_{D\_C}$ and a previous desired pressure $P_{D\_P}$. The pressure difference module 310 generates a desired pressure difference $P_{D\_D}$. A suspension module 312 receives the desired pressure difference $P_{D\_D}$. When the desired pressure difference $P_{D\_D}$ is greater than a predetermined pressure difference, the difference calculation suspension module 312 suspends operation of the pressure diagnostic system until the desired pressure difference $P_{D\_D}$ is less than the predetermined pressure difference.

A lag filter module 318 determines lag filter terms based on the desired pressure difference $P_{D\_D}$. The lag filter module 318 applies the lag filter to the pressure error $P_E$ to generate a lag filtered pressure error $P_{E\_LF}$.

A fault module 320 compares the lag filtered pressure error $P_{E\_LF}$ to one or more thresholds and selectively generates a fault based on the comparison. For example only, the fault module 320 may select high and low thresholds based on the current desired pressure $P_{D\_C}$ or other input values (for example only, engine speed such as revolutions per minute (RPM), injector pulsewidth, air per cylinder, total fuel flow, etc.). In some examples, the fault module 320 compares the lag filtered pressure error $P_{E\_LF}$ to high and low thresholds.

Figure 5:
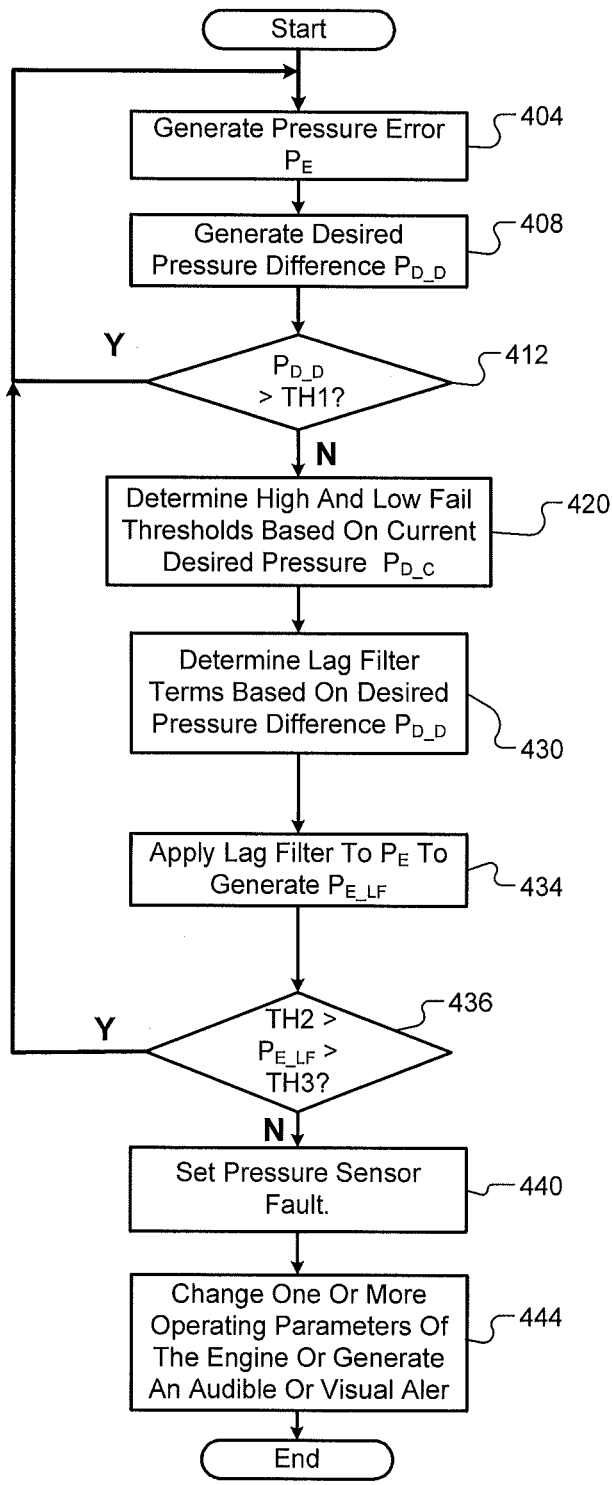
FIG. 5 illustrates a method for diagnosing first and second pressure sensors in the engine.

Referring now to FIG. 5, a method for diagnosing faults in a pressure sensing system with two pressure sensors is shown. At 404, control generates a pressure error $P_E$ based on the filtered pressures $P1_F$ and $P2_F$. At 408, control generates a desired pressure difference $P_{D\_P}$ based on the current and prior desired pressures $P_{D\_C}$ and $P_{D\_D}$, respectively. At 412, control determines whether the desired pressure difference $P_{D\_D}$ is greater than a threshold $TH_1$. If 412 is true, control returns to 404. If 412 is false, control determines thresholds $TH_2$ and $TH_3$ based on the current desired pressure $P_{D\_C}$ or other input values at 420.

At 430, control determines lag filter terms based on the previous the desired pressure difference $P_{D\_D}$ or other input values. At 434, control applies the lag filter to the pressure error $P_E$. At 436, control compares the lag filtered pressure error $P_{E\_LF}$ to thresholds $TH_2$ and $TH_3$. If the lag filtered pressure error $P_{E\_LF}$ is between the thresholds $TH_2$ and $TH_3$, control returns to 404. If the lag filtered pressure error $P_{E\_LF}$ is not between the thresholds TH$_2$ and TH$_3$, control continues at 440 and sets the pressure sensor fault. At 444, control changes one or more operating parameters of the engine or generates an audible or visual driver alert when the sensor fault is set.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
   a pressure error calculating module that generates a pressure error based on a first pressure signal from a first fuel pressure sensor of a fuel supply system and a second pressure signal from a second fuel pressure sensor of the fuel supply system;
   a desired pressure difference calculating module that generates a desired pressure difference based on a current desired pressure for the fuel supply system and a prior desired pressure for the fuel supply system;
   a lag filter module that applies a lag filter to the pressure error to generate a lag filtered pressure error; and
   an engine control module that selectively changes an operating parameter of an engine based on the lag filtered pressure error.

2. The system of claim 1, wherein the lag filter module selects lag filter terms based on the desired pressure difference.

3. The system of claim 1, further comprising a filtering module that filters the first pressure signal and the second pressure signal before the pressure error calculating module generates the pressure error.

4. The system of claim 1, further comprising an out of range module that determines whether the first pressure signal and the second pressure signal are out of range before the pressure error calculating module generates the pressure error.

5. The system of claim 1, wherein the pressure error calculating module generates the pressure error based on an inverse of a function of ratio of the second pressure signal to the first pressure signal.

6. The system of claim 5, wherein the function is a square root of the ratio of the second pressure signal to the first pressure signal.

7. The system of claim 1, further comprising a fault module that selectively triggers a fault based on comparison of the lag filtered pressure error to a pressure range.

8. The system of claim 7, wherein the fault module adjusts the pressure range based on the current desired pressure.

9. The system of claim 1, further comprising a suspension module that selectively suspends identification of a fault based on the desired pressure difference.

10. The system of claim 9, wherein the suspension module suspends identification of the fault when the desired pressure difference is greater than a predetermined desired pressure difference.

11. A method comprising:
    using an engine control module:
       generating a pressure error based on a first pressure signal from a first pressure sensor of a fuel supply system and a second pressure signal from a second pressure sensor of the fuel supply system;
       generating a desired pressure difference based on a current desired pressure for the fuel supply system and a prior desired pressure for the fuel supply system;
       applying a lag filter to the pressure error to generate a lag filtered pressure error; and
       selectively changing an operating parameter of an engine based on the lag filtered pressure error.

12. The method of claim 11, further comprising selecting lag filter terms based on the desired pressure difference.

13. The method of claim 11, further comprising suspending identification of a fault based on the desired pressure difference.

14. The method of claim 11, further comprising suspending identification of a fault when the desired pressure difference is greater than a predetermined desired pressure difference.

15. The method of claim 11, further comprising filtering the first pressure signal and the second pressure signal before generating the pressure error.

16. The method of claim 11, further comprising determining whether the first pressure signal and the second pressure signal are out of range before generating the pressure error.

17. The method of claim 11, wherein generating the pressure error is based on an inverse of a function of ratio of the second pressure signal to the first pressure signal.

18. The method of claim 17, wherein the function is a square root of the ratio of the second pressure signal to the first pressure signal.

19. The method of claim 11, further comprising selectively triggering a fault based on comparison of the lag filtered pressure error to a pressure range.

20. The method of claim 19, further comprising adjusting the pressure range based on the current desired pressure.

* * * * *